United States Patent Office 3,463,649
Patented Aug. 26, 1969

3,463,649
LADLE BRICK
Robert F. Moore, East Liverpool, Ohio, assignor to Globe Refractories, Inc., Newell, W. Va., a corporation of West Virginia
No Drawing. Continuation-in-part of application Ser. No. 584,080, Oct. 4, 1966. This application May 7, 1968, Ser. No. 727,368
Int. Cl. C04b 35/66
U.S. Cl. 106—67                                      1 Claim

ABSTRACT OF THE DISCLOSURE

The invention provides bloating class ladle brick made from batches of fire clay normally possessing insufficient bloating capacity for making ladle brick with which there is incorporated from about 0.25 to 4 percent of pyrite. The batches are tempered with water, formed into shapes which are dried and then heated at a temperature to produce a ceramic bond and maximum linear shrinkage but below that to cause bloating. Ladle linings for receiving molten steel are constructed from the brick and upon contact with the steel undergo bloating with closure of the joints between the bricks.

---

This application is a continuation-in-part of my copending application Ser. No. 584,080, filed Oct. 4, 1966, now abandoned.

Ladle brick have been used for a great many years for lining ladles into which steel is teemed from the blast furnace, open hearth or basic oxygen furnaces or other source, such as electric furnaces.

Generally, ladle brick are made from fire clays of relatively low refractoriness with a P.C.E. (Pyrometic Cone Equivalent) of cone 18 to cone 26 (2272° F. to 2950° F.). Ladle brick are commonly made from fire clays containing by weight from 50 to 65 percent of $SiO_2$, 20 to 30 percent of $Al_2O_3$, 1.0 to 2.0 percent of $TiO_2$, 0.2 to 1.0 percent of CaO, 0.4 to 1.0 percent of MgO, 1.5 to 5.0 percent of $Fe_2O_3$, and 2.0 to 4.0 percent of alkalies. Ladle brick must have the ability to develop, upon firing, bulk density high enough to minimize erosion by steel and slag, low porosity and good thermal shock reistance to resist spalling.

A particular prerequisite of ladle brick is that it will bloat, or expand in all directions, when the molten steel first contacts the bricks in the ladle. This property has been provided by certain fire clays which when fired sufficiently at high temperatures develop a glassy phase from fluxing constituents of the clay and which has a viscosity high enough to trap gas liberated from the brick upon contact with molten steel and to retain the gas when brick are cooled to atmospheric temperature.

In some areas of this country there are some fire clays which are naturally bloating when made into ladle brick. However, such bloating clays do not occur generally throughout this country but rather are found in somewhat restricted areas which likewise are not widely distributed. Consequently, although it would be desirable to make ladle brick at plants producing other types of refractory brick, the cost of transportation of bloating clays to any substantial distance from their source would render their use uneconomical because of prohibitive transportation costs.

In addition to resistance to penetration, erosion and thermal shock, a major and controlling property of ladle brick is that when they bloat the resultant expansion closes the joints between the bricks to produce what is effectively a monolithic structure and thus to prevent penetration of steel and slag between the bricks and also to minimize wear, whereby the life of a ladle brick lining is prolonged in comparison with a lining not having the sealing effect of a bloating brick.

It is among the objects of this invention to provide a method of making bloating class type ladle brick from fire clays that bloat insufficiently for the manufacture of ladle brick, which is applicable to fire clays of relatively low refractoriness that are more generally available to ceramic plants than are bloating clays, which is simple, inexpensive, requires no special operating procedure or apparatus not presently used for the manufacture of refractory fire clay bricks, which is productive of bricks that bloat satisfactorily to the extent necessary for ladle lining, and the extent of bloating of which is controllable over a desirable range.

A further object is to provide ladle bricks made in accordance with the foregoing object.

Another object is to provide steel ladle linings constructed from bloating bricks.

Other objects will be understood from the following specification.

The bricks of this invention are identified as Type A Ladle Brick in accordance with A.S.T.M. Designation C435-61T as accepted in June 1961.

The invention is applicable to fire clays possessing insufficient bloating capacity for use in making ladle bricks but which contain sufficient fluxing agents to form the necessary viscous glassy phase for trapping and retaining gases liberated from the clay at high temperatures. For this purpose the clays should contain, by weight, about 1 to 4 percent iron as $Fe_2O_3$ and 2 to 4 percent alkalies.

The invention is predicated upon my discovery that its stated objects are attained by incorporating in batches made from such fire clays from about 0.25 to about 4.0 percent, by weight, of pyrite ($FeS_2$).

In the practice of the invention the fire clay is crushed and ground and pyrite in ground form is added in an amount up to 1 percent, by weight, and the batch is then tempered, as with water. After thorough mixing the batch is formed into brick shapes under high pressure. The shapes are then dried at a relatively low temperature followed by firing to develop the necessary ceramic bond. They are then cooled at a regulated rate to atmospheric temperature when they are ready for installation.

As an example of the practice of the invention a fire clay of the following chemical composition 50 to 65% $SiO_2$
20 to 30% $Al_2O_3$
1 to 2% $TiO_2$
.2 to 1.0% CaO
.4 to 1.0% MgO
1.5 to 5.0% $Fe_2O_3$
2.0 to 4.0% Alkalies ($Na_2O$ and $K_2O$)

is crushed and ground to have a particle size distribution determined with Tyler Standard Scale Sieves as shown:

0% plus 6 mesh screen
26 to 32% plus 10 mesh screen
10 to 14% thru 10 mesh on 14 mesh
35 to 41% thru 14 mesh on 65 mesh
20 to 25% thru 65 mesh The above sized mixture of clay and pyrite is then thoroughly mixed with 4% to 6% water and formed on a mechanical press at 2000 p.s.i. to form shapes 8½″ long by 4¼″ wide and 2½″ thick. The pressed brick are thoroughly dried (tempering water removed) in a chamber under temperature not to exceed about 350° F. The dried brick are fired to higher temperatures in a car tunnel kiln at a predetermined schedule not to exceed a rise of 25 degrees F. per hour. The top temperature in the kiln should not exceed 2000° F. The total firing time for such bricks will require about 120 hours. The bricks are then cooled uniformly and slowly for a period of 48 hours down to atmospheric temperature. The heat treatment must be such as to produce maximum linear shrinkage, suitable ceramic bond for adequate strength, and sufficient glassy phase to permit expansion when reheated to 2350° F. (ASTM test C113E schedule E).

The bricks are then ready for installation in a ladle, and upon contact with molten steel at, for instance, 2800° F., bloating occurs with the desired penetration of the bloated material into and sealing of the joints between the bricks, as described above.

As will be understood in the trade, the foregoing procedure may be varied as to details of bricks shape and size, pressing pressure, etc.

As illustrating the benefit of the invention, ladle bricks of standard shape were prepared from three clays of inadequate bloating capacity containing the following percentages, by weight, of pyrite which after firing and upon being reheated to 2350° F. (ASTM test C113 schedule E) showed the following permanent linear expansion:

| Pyrite, percent | Percent expansion | | |
|---|---|---|---|
| | Clay A | Clay B | Clay C |
| 0 | 3.80 | 2.63 | 6.10 |
| 0.25 | 12.00 | 12.60 | 9.7 |
| 0.50 | 17.00 | 18.33 | 9.4 |
| 1.0 | 21.00 | 28.03 | 11.1 |

For satisfactory use as ladle brick, the brick should show at least 8 percent linear expansion upon bloating.

The foreging data show how that is attained by the practice of the invention as well as how the extent of bloat may be controlled.

In the case of clays of non-bloating grade, say capable of about 2 percent linear expansion, there may be used combinations of pyrite and bauxite to obtain results characteristic of the invention provided, of course, that sufficient fluxing agents are present to satisfy the requirements of a bloating clay, as indicated above.

According to the provisions of the patent statutes, I have explained the principle of my invention and have described what I now consider to represent its best embodiment. However, I desire to have it understood that, within the scope of the appended claim, the invention may be practiced otherwise than as specifically described.

I claim:

1. A bloating class ladle brick consisting essentially of a shape of clay naturally having insufficient bloating capacity for use as a bloating clay, and 0.25 to 4 percent of pyrite, the shape being characterized by having undergone maximum linear shringake, a glass phase and by bloating upon contact with molten steel without undergoing further linear shrinkage.

References Cited

UNITED STATES PATENTS 2,493,763  1/1950  Klinefelter _____ 106—41
2,526,289  10/1950  Smith _____ 106—67

JAMES E. POER, Primary Examiner